(12) United States Patent
Han

(10) Patent No.: US 9,117,390 B2
(45) Date of Patent: Aug. 25, 2015

(54) DISPLAY DEVICE AND DRIVING METHOD OF THE SAME

(71) Applicant: Samsung Display Co., Ltd., Yongin, Gyeonggi-Do (KR)

(72) Inventor: Sang-Myeon Han, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 104 days.

(21) Appl. No.: 13/853,564

(22) Filed: Mar. 29, 2013

(65) Prior Publication Data

US 2014/0139505 A1   May 22, 2014

(30) Foreign Application Priority Data

Nov. 20, 2012  (KR) ......................... 10-2012-0131913

(51) Int. Cl.
| G09G 5/00 | (2006.01) |
| G09G 3/00 | (2006.01) |
| H04N 13/04 | (2006.01) |
| G09G 3/32 | (2006.01) |

(52) U.S. Cl.
CPC .............. *G09G 3/003* (2013.01); *G09G 3/3233* (2013.01); *H04N 13/0438* (2013.01); *H04N 13/0497* (2013.01); *G09G 2300/0852* (2013.01); *G09G 2300/0861* (2013.01); *G09G 2310/0216* (2013.01)

(58) Field of Classification Search
CPC ................................ G09G 3/3208; G09G 5/10
USPC .......... 345/55, 85.2–104, 204–214, 690, 691; 257/565; 349/56, 84, 122–139
See application file for complete search history.

(56) References Cited

U.S. PATENT DOCUMENTS

| 8,395,609 | B2* | 3/2013 | Kwak | 345/206 |
| 2005/0264500 | A1* | 12/2005 | Shirasaki et al. | 345/77 |
| 2006/0125738 | A1* | 6/2006 | Kim et al. | 345/76 |
| 2006/0267886 | A1* | 11/2006 | Ozaki et al. | 345/76 |
| 2007/0030219 | A1* | 2/2007 | Park et al. | 345/76 |
| 2007/0115225 | A1* | 5/2007 | Uchino et al. | 345/76 |
| 2007/0115244 | A1* | 5/2007 | Shin et al. | 345/100 |
| 2008/0157682 | A1* | 7/2008 | Kwon | 315/154 |
| 2009/0278771 | A1* | 11/2009 | Yamamoto et al. | 345/76 |
| 2010/0026636 | A1* | 2/2010 | Jang et al. | 345/173 |
| 2010/0033408 | A1* | 2/2010 | Kawabe | 345/76 |
| 2012/0050274 | A1* | 3/2012 | Yoo et al. | 345/419 |

(Continued)

FOREIGN PATENT DOCUMENTS

| KR | 10-2007-0015824 A | 2/2007 |
| KR | 10-2012-0043301 A | 5/2012 |

(Continued)

*Primary Examiner* — Prabodh M Dharia
(74) *Attorney, Agent, or Firm* — Russell E. Bushnell, Esq.

(57) ABSTRACT

A display device and a driving method thereof. The display device includes a plurality of pixels, each receiving a predetermined on-bias voltage transferred through a data line during one frame, receiving a first image data signal corresponding to the corresponding frame through the data line and storing the same, and emitting light according to a driving current that corresponds to a second image data signal that corresponds to the previous frame of the corresponding frame, and a first period for storing the first image data signal and a second period for light emission according to a driving current corresponding to the second image data signal overlap each other in one frame.

30 Claims, 10 Drawing Sheets

(56) References Cited

U.S. PATENT DOCUMENTS

| | | | |
|---|---|---|---|
| 2012/0086694 A1* | 4/2012 | Tseng et al. | 345/212 |
| 2012/0146979 A1* | 6/2012 | Kim et al. | 345/211 |
| 2013/0044047 A1* | 2/2013 | Tomida et al. | 345/76 |
| 2013/0106836 A1* | 5/2013 | Kim et al. | 345/419 |
| 2013/0113691 A1* | 5/2013 | Takasugi | 345/77 |
| 2013/0127932 A1* | 5/2013 | Han | 345/691 |
| 2013/0264566 A1* | 10/2013 | Umezaki | 257/43 |
| 2014/0062978 A1* | 3/2014 | Shin | 345/204 |
| 2014/0071112 A1* | 3/2014 | Han | 345/212 |
| 2014/0111563 A1* | 4/2014 | Hwang et al. | 345/691 |
| 2014/0145187 A1* | 5/2014 | Umezaki | 257/43 |

FOREIGN PATENT DOCUMENTS

| | | |
|---|---|---|
| KR | 10-2012-0062499 A | 6/2012 |
| KR | 10-2012-0065139 A | 6/2012 |

\* cited by examiner

DISPLAY DEVICE AND DRIVING METHOD OF THE SAME

CLAIM OF PRIORITY

This application makes reference to, incorporates the same herein, and claims all benefits accruing under 35 U.S.C. §119 from an application earlier filed in the Korean Intellectual Property Office on the 20$^{th}$of Nov. 2012 and there duly assigned Serial No. 10-2012-0131913.

BACKGROUND OF THE INVENTION

1. Field of the Invention

The present invention relates to a display device and a driving method thereof.

2. Description of the Related Art

Recently, a display panel has increased in size and reduced in weight, and a stable driving method of a frame has been developed in order to display an accurate and clear image with high-integration and high-precision of a display device which is required to implement a 3D stereoscopic image.

Particularly, a display device including a large-sized display panel or a high-speed frame driving for driving of the 3D stereoscopic image is required, but since respective periods for initialization of data voltage, compensation of threshold voltage of a driving transistor, writing of data, and light emission are not sufficiently ensured by the high-speed driving mode, it is difficult to implement images having accurate luminance.

Further, in order to solve the problem, various researches and development for a pixel circuit structure, a driving mode, and luminance compensation have been conducted, but since the pixel circuit structure is complicated and power consumption may be increased according to the luminance compensation or the driving mode, adverse effects that production costs increase and non-uniformity of luminance is not improved may occur.

Accordingly, researches on a display device and a driving method thereof are required, which improves diversified aspects such as simplification of pixel circuits and wirings, a simple displacement of layouts, ensuring for a sufficient period of each driving process, and ensuring for a manufacturing yield and an aperture ratio of the display panel.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a display panel that can sufficiently assure each driving process of a display device and improve a response waveform of a pixel circuit.

Further, the present invention has been made in an effort to provide a display device having advantages of providing relatively simple displacement of layouts without adding a separate voltage wire circuit in the display device and ultimately ensuring an aperture ratio and ensuring a manufacturing yield of the display panel.

In addition, the present invention has been made in an effort to provide a display device having advantages of implementing accurate luminance and high-quality images by sufficiently ensuring a threshold voltage compensating period of the transistor and sufficiently ensuring a data writing period and a light emitting period during the driving process of the display device.

A display device according to an exemplary embodiment of the present invention includes a plurality of pixels, each receiving a predetermined on-bias voltage transferred through a data line during one frame, receiving a first image data signal corresponding to the corresponding frame through the data line and storing the same, and emitting light according to a driving current that corresponds to a second image data signal that corresponds to the previous frame of the corresponding frame. A first period for storing the first image data signal and a second period for light emission according to a driving current corresponding to the second image data signal may overlap each other in one frame.

The frame may include: an on-bias period during which a predetermined on-bias voltage is transferred to a driving transistor of each of the plurality of pixels; a reset period during which a predetermined reset voltage is transferred to a gate electrode of the driving transistor through the data line; an initialization period during which a drain electrode voltage of the driving transistor of the pixel to first level by applying a first power source voltage with the first level from a power supply; a compensation period during which threshold voltages of driving transistors of the respective pixels are simultaneously compensated; a data transferring period during which a first voltage corresponding to a data voltage according to the second image data signal to a gate electrode of the driving transistor; a data writing period during which the first image data signal is written in response to scan signals sequentially transferred to the respective pixels; and a light emitting period being overlapped with the data writing period, and during which organic light emitting diodes of the plurality of pixels simultaneously emit light according to the first voltage transferred during the data transmitting period.

The on-bias voltage and the first level voltage may have a gate-on voltage level to turn on constituent elements of each pixel.

The reset voltage may be set to a voltage value between the lowest value and the highest value of a data voltage according to an image data signal.

The first voltage is reflected with the amount of voltage changed according to a capacitance ratio of a storage element connected to a gate electrode of the driving transistor to a data voltage according to the second image data signal.

The plurality of pixels do not emit light during the on-bias period, the reset period, the initialization period, the compensation period, and the data transferring period.

The first image data signal is a first view point image data signal or a second view point image data signal corresponding to the corresponding frame, the second image data signal is a first view point image data signal or a second view point image data signal corresponding to the previous frame, and the first image data signal and the second image data signal may have different view points.

The first image data signal may be a first view point image data signal and a second view point image data signal corresponding to the corresponding frame, and light emission simultaneously may occur in the plurality of pixels according to a driving current corresponding to the first image data signal during a light emitting period of the next frame of the corresponding frame.

The first period is equal to or shorter than the second period.

Each of the plurality of pixels includes: an organic light emitting diode; a first transistor transferring the driving current to the organic light emitting diode; a second transistor transferring a data voltage according to the first image data signal to a gate electrode of the first transistor according to the corresponding scan signal among a plurality of scan signals; a third transistor provided between a gate electrode and a drain electrode of the first transistor for diode-connection therebetween; a fourth transistor provided between the first transistor and the second transistor to control a potential difference of the gate electrode of the first transistor; a fifth transistor transferring a data voltage according to a second image data signal written in the previous frame to the gate electrode of the first transistor; a storage capacitor provided between the gate electrode and a source electrode of the first transistor to store a voltage according to a potential difference between the two electrodes; a compensation capacitor provided between the gate electrode of the first transistor and the storage capacitor to maintain a gate electrode voltage of the first transistor with a predetermined corresponding voltage value; and a sustain capacitor storing a data voltage according to the first image data signal or the second image data signal transferred through the data line.

The sustain capacitor may store the data voltage stored according to the first image data signal until a data transferring period of the next frame of the corresponding frame, and may store a data voltage according to a second image data signal written in the previous frame until a data transferring period of the corresponding frame.

A first power source voltage applied to the source electrode of the first transistor is transferred in low level during the initialization period.

A second power source voltage connected to the drain electrode of the first transistor is transferred in low level during the light emitting period.

The plurality of scan signals are simultaneously transferred in a gate-on voltage level during the on-bias period, the reset period, the initialization period and the compensation period and sequentially transferred in the gate-on voltage level to each pixel line during the data writing period.

The first control signal transferred to a gate electrode of the third transistor is transferred in the gate-on voltage level during the compensation period, the compensation period, and the data transferring period The second control signal transferred to a gate electrode of the fourth transistor is transferred in the gate-on voltage level during the on-bias period the reset period.

The third control signal transferred to a gate electrode of the fifth transistor is transferred in the gate-on voltage during the data transferring period, the data writing period, and the light emitting period.

A predetermined on-bias voltage is applied through a data line connected to a source electrode of the second transistor during an on-bias period while the second transistor and the fourth transistor are in the turn-on state.

A predetermined reset voltage is applied through the data line connected to the source electrode of the second transistor during a reset period while the second transistor and the fourth transistor are in the turn-on state, and the reset voltage is higher than the on-bias voltage.

For example, the fifth transistor may be provided between a node of the second transistor and the fourth transistor and the sustain capacitor, and the sustain capacitor may include a first electrode connected to the fifth transistor and a second electrode connected to a power supply that transfers a predetermined reference voltage.

For another example, the sustain capacitor may include a first electrode connected to a node of the second transistor and the fourth transistor and a second electrode connected to the fifth transistor, and the fifth transistor may be provided between the sustain capacitor and a power supply transferring a predetermined reference voltage.

As another exemplary embodiment of the present invention, each of the plurality of pixels includes: an organic light emitting diode; a first transistor transferring the driving current to the organic light emitting diode; a second transistor transferring a voltage applied through the data line to a gate electrode of the first transistor; a third transistor provided between the gate electrode and the drain electrode of the first transistor for diode-connection therebetween; a fourth transistor provided between the first transistor and the second transistor to control a potential difference of the gate electrode of the first transistor; a fifth transistor transferring a data voltage according to a first image data signal of the corresponding frame according to the corresponding scan signal among a plurality of scan signals, or transferring a data voltage according to a second image data signal written in the previous frame to the gate electrode of the first transistor; a storage capacitor provided between the gate electrode and the source electrode of the first transistor to store a voltage according to a potential difference between the two electrodes; a compensation capacitor provided between the gate electrode of the first transistor and the storage capacitor to maintain a gate electrode voltage of the first transistor with a predetermined corresponding voltage; and a sustain capacitor storing a data voltage according to the first image data signal or the second image data signal transferred through the data line.

The first power source voltage applied to the source electrode of the first transistor is transferred in low level during the initialization period.

The second power source voltage connected to the drain electrode of the first transistor is transferred in low level during the light emitting period.

The plurality of scan signals are simultaneously transferred in a gate-on voltage level to the gate electrode of the fifth transistor during the data transferring period, and sequentially transferred in the gate-on voltage level to the gate electrode of the fifth transistor for each pixel line during the data writing period.

The first control signal transferred to the gate electrode of the third transistor is transferred in the gate-on voltage level during the compensation period.

The second control signal transferred to the gate electrode of the fourth transistor is transferred in the gate-on voltage level during the on-bias period, the reset period, the compensation period, and the data transferring period.

The third control signal transferred to the gate electrode of the second transistor is transferred in the gate-on voltage level during the on-bias period, the reset period, the initialization period, the compensation period, the data writing period, and the light emitting period.

For example, the fifth transistor may be provided between a node of the second transistor and the fourth transistor and the sustain capacitor, the gate electrode of the fifth transistor may be connected to a scan line transferring the corresponding scan line, and the sustain capacitor may include a first electrode connected to the fifth transistor and a second electrode connected to a power supply transferring a predetermined reference voltage.

For another example, the fifth transistor may be provided between a node of the second transistor and the fourth transistor and the sustain capacitor, the gate electrode of the fifth transistor may be connected to a scan line transferring the corresponding scan line, and the sustain capacitor may include a first electrode connected to the fifth transistor and a second electrode connected to a power supply transferring a predetermined reference voltage.

The display device may further include: a scan driving generating and transferring a plurality of scan signals that activate driving of the plurality of pixels; a data driver transferring a predetermined on-bias voltage or a data voltage according to an image data signal corresponding to the plurality of pixels through the data line; a power controller controlling a driving power source voltage and a reference voltage supplied to the plurality of pixels; a compensation control signal unit generating and transferring a first control signal, a second control signal, and a third control signal for controlling turning on/off of transistors included in the respective pixels according to periods included in the frame; and a timing controller generating an image data signal corresponding to the frame by processing an external image signal and transferring the image data signal to the data drive, and controlling driving of the scan driver, the data driver, the power controller, and the compensation control signal unit.

According to another exemplary embodiment of the present invention, a method is provided for driving a display device including a display panel that includes a plurality of pixels, each receiving a predetermined on-bias voltage through a data line, receiving and storing a first image data signal corresponding to the corresponding frame through a data line, and emitting light according to a driving current corresponding to a second image data signal that corresponds to the previous frame of the corresponding frame.

In further detail, the method includes: an on-bias step for transferring a predetermined on-bias voltage to a driving transistor of each of the plurality of pixels; a reset step for transferring a predetermined reset voltage to a gate electrode of the driving transistor through the data line; an initialization step for setting a drain electrode voltage of the driving transistor of the pixel to a first level by applying a first power source voltage in the first level from a power supply; a compensation step for simultaneously compensating threshold voltages of the driving transistors of the respective pixels; a data transferring step for transferring a first voltage corresponding to a data voltage according to the second image data signal to the gate electrode of the driving transistor; a data writing step for writing the first image data signal in response to scan signals sequentially transferred to the respective pixels; and a light emitting step being overlapped with the data writing step and during which organic light emitting diodes of the respective pixels simultaneously emitting light according to the first voltage transferred in the data transferring step.

According to the exemplary embodiments of the present invention, since respective driving processes such as initializing of data voltage of the display device, compensating of threshold voltage of the transistor, writing of data, and emitting of light may be sufficiently secured, it is possible to provide uniformity of images and accurate luminance expression in the display panel.

In particular, compared to a conventional display device that cannot easily apply an on-bias voltage to a driving transistor of a pixel circuit, the display device according to the exemplary embodiment of the present invention includes a pixel circuit that applies an on-bias voltage to a driving transistor using a wire used in a conventional design, and according to it is advantageous to improve a response waveform.

In addition, it is possible to provide a driving method of a display device which may have large-sized high resolution and high-speed driving.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
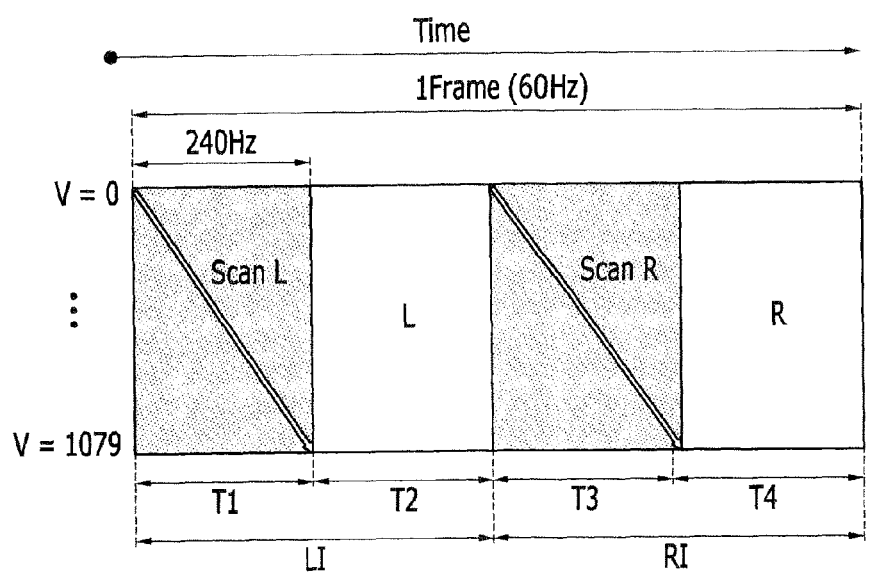
FIG. 1 is a diagram illustrating a driving method of a display device in the related art.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a diagram illustrating a driving method of a display device in the related art.

A driving method of a display device illustrated in FIG. 1 illustrates an example among various driving methods of the display device in the related art. Particularly, FIG. 1 illustrates that the display device is driven by dividing one frame 60 Hz into a first view point image period LI and a second view point image period RI, as a driving method of implementing a 3D stereoscopic image.

The first view point may be a left (right) eye view point, and the second view point may be a right (left) eye view point.

The same object is displayed for one frame by transferring an image data signal divided into the first view point and the second view point to be displayed so that a user feels a 3D stereoscopic effect.

Then, the first view point image period LI and the second view point image period RI include scan periods ScanL and ScanR, and light emitting periods L and R so as to display images for the respective view points by driving all pixels of the display panel, respectively.

That is, the first view point image period LI includes a first view point scan period T1 sequentially activating the respective pixels so as to write a first view point image data signal in all the pixels of the display panel and a first view point light emitting period T2 displaying images according to the first view point image data signal. Further, the second view point image period RI includes a second view point scan period T3 sequentially activating the respective pixels so as to write a second view point image data signal in all the pixels of the display panel and a second view point light emitting period T4 displaying images according to the second view point image data signal.

According to the driving method of the display device in the related art in FIG. 1, in the case of the stereoscopic image driving, since at least the respective scan period and light emitting period need to be included in order to display a first view point image and a second view point image for one frame 60 Hz, the first view point image and the second view point image need to be processed at ¼ frame 240 Hz, respectively.

Further, as illustrated in FIG. 1, when the scan periods for all the pixels of the display panel and the light emitting periods according to the image data signal are separated from each other and the images are simultaneously displayed in all the pixels for the light emitting periods, it may be advantageous to prevent a motion blur phenomenon and implement the 3D stereoscopic image, but it is difficult to express accurate luminance because the light emitting period is limited to a half of one frame or less. Accordingly, even in the case of the non-3D stereoscopic image driving, since a light emitting ratio is not increased to maximize the light emitting luminance in order to ensure average luminance, there are problems in that driving voltage increases and power consumption increases. In addition, current is also increased during emitting of the light and as a result non-uniformity of luminance is relatively increased due to an IR Drop (voltage drop).

Figure 2:
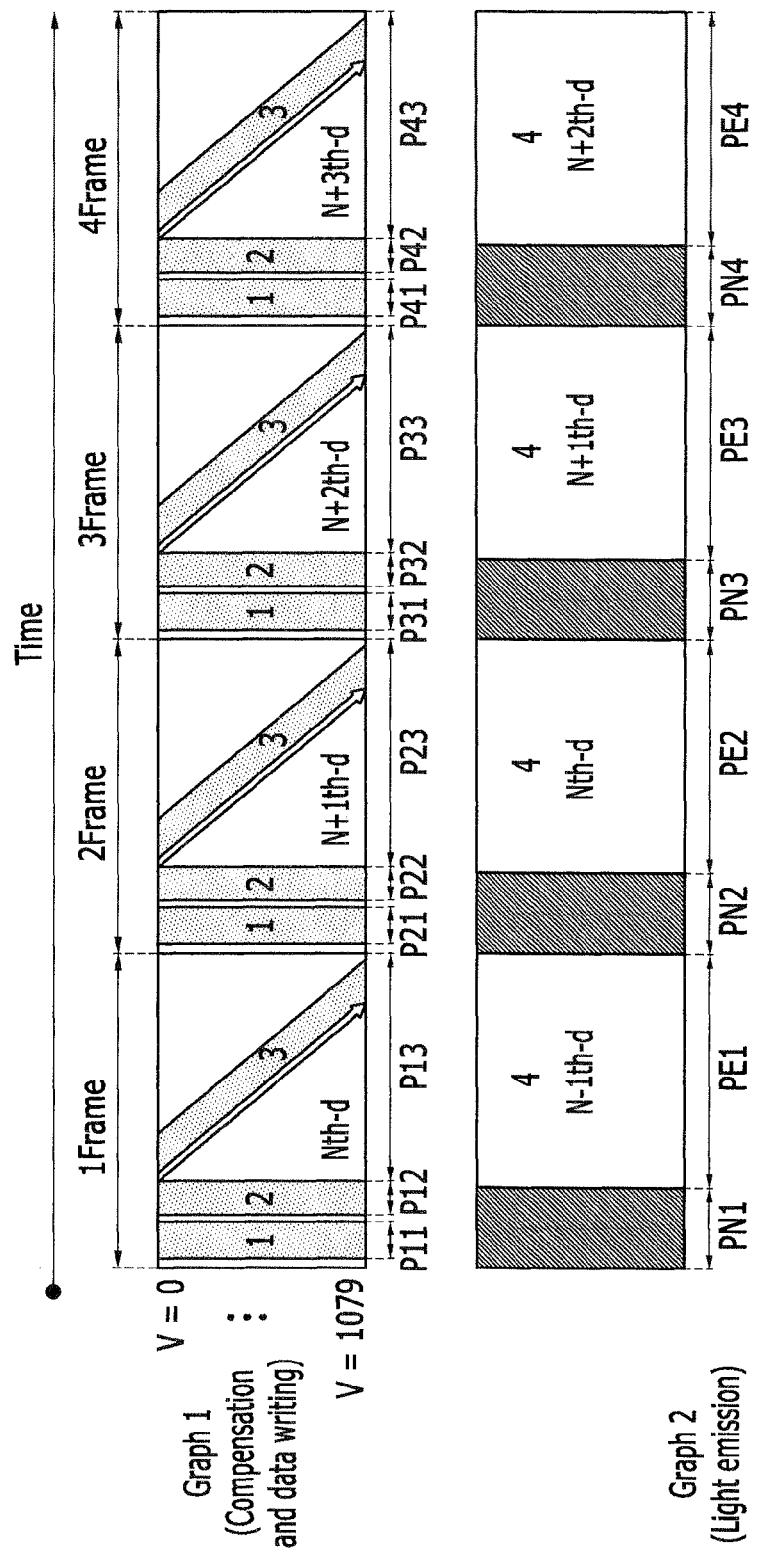
FIG. 2 is a diagram illustrating a driving method of a display device according to an exemplary embodiment of the present invention.

Accordingly, the present invention is supposed to propose a driving method of a display device enough to emit light by writing data after sufficiently resetting a pixel circuit of the entire display panel and compensating threshold voltage of a transistor when the image is expressed regardless of driving of a general image or driving of the 3D stereoscopic image. FIG. 2 is a diagram illustrating a driving method of a display device according to an exemplary embodiment of the present invention.

The driving method of FIG. 2 illustrates a general method of implementing a 2D image.

FIG. 2 illustrates a first graph Graph 1 representing a process of compensating threshold voltage of a driving transistor of each pixel included in a display panel and writing data while the same time elapses and a second graph Graph 2 representing a light emitting process of the display panel.

The display panel according to the exemplary embodiment of FIG. 2 includes total 1080 pixel lines, but it is not necessarily limited thereto.

Further, in FIG. 2, as the time elapses, each frame is driven from a first frame 1Frame in sequence.

In the driving method of the display device of the present invention according to FIG. 2, each of a plurality of frames includes a reset period 1, a threshold voltage compensating period 2, a data writing period 3, and a light emitting period 4. Among the periods, the data writing period 3 and the light emitting period 4 are simultaneously performed. However, such a driving method is one exemplary embodiment, and the display device according to the present invention can be driven by various driving methods. That is, an on-bias period for applying an on-bias voltage to the driving transistor may further be included before the reset period 1 in order to improve a light response characteristic of pixels.

In addition, an initialization period may further be included after the reset period 1 in order to stably initialize a gate electrode voltage of the driving transistor of each pixel.

Further, a data transferring period may further be included between the threshold voltage compensation period 2 and the data writing period 3 in order to accurately transfer a data voltage according to an image signal to a gate electrode of the driving transistor of each pixel.

In further detail, operation of each period will be described with reference to a basic driving process of the display device according to the exemplary embodiment shown in FIG. 2.

First, in the exemplary embodiment of FIG. 2, pixel circuits of the entire display panel are simultaneously reset for a reset period P11 of the first frame 1 Frame. Here, the reset of the pixel circuit means that voltage according to the data signal inputted to each pixel circuit for a previous frame is set as predetermined reference voltage (reset voltage). That is, the reset of the pixel circuit means that the predetermined reset voltage is maintained by charging or discharging the data voltage according to each data signal of the previous frame which is charged in a storage capacitor of the pixel circuit.

Next, threshold voltages of the respective driving transistors included the pixel circuits of the entire display panel are simultaneously compensated for a threshold voltage compensating period P12 of the first frame. Since the threshold voltages of the driving transistors included the respective pixel circuits of the display panel are different from each other according to factors of a manufacturing process of the display panel or material characteristics, it is difficult to accurately express luminance of the pixel due to a deviation of the threshold voltages. Accordingly, for the threshold voltage compensating period P12, the threshold voltages of the driving transistors of all pixels are compensated at once in order to improve non-uniformity of luminance according to a threshold voltage deviation of the driving transistor of each pixel.

According to another exemplary embodiment, an initialization period (not illustrated) may be further included between the reset period P11 and the threshold voltage compensating period P12. The initialization period is a period of applying initial voltage to the storage capacitor of each pixel in order to more exactly perform the reset for the data voltage of the previous frame which is applied to each pixel of the display panel.

The reset period P11 and the threshold voltage compensating period P12 of the first frame 1 Frame correspond to a non-light emitting period PN1 for which all the pixels do not emit the light.

After the pixel circuits of the entire display panel are reset for the reset period and the threshold voltages of the driving transistors of the entire display panel are compensated for the threshold voltage compensating period, the image data signals corresponding to the next frame of the corresponding frame are sequentially transferred to each pixel of the entire display panel for each line for the data writing period. That is, in FIG. 2, an image data signal Nth-d corresponding to a second frame 2Frame which is the next frame is sequentially written for a data writing period P13 of the first frame 1Frame.

After the image data signal Nth-d corresponding to the second frame 2Frame is written in the respective pixels for the data writing period P13 of the first frame 1 Frame, the pixels of the entire display panel simultaneously display images according the image data signals for a light emitting period PE2 of the second frame 2Frame.

In FIG. 2, for the data writing period P13 of the first frame 1 Frame, the image data signals Nth-d corresponding to the second frame 2Frame are sequentially written in each pixel of the display panel and simultaneously, all the pixels of the display panel emit light corresponding to an image data signal N−1th-d written in the previous frame for a light emitting period PE1 of the first frame 1Frame.

Similarly, for the second frame 2Frame subsequent to the first frame, a reset period P21 of resetting data voltage according to the image data signals Nth-d written in the previous first frame, a threshold voltage compensating period P22 of compensating threshold voltage of the driving transistor of each pixel of the display panel, and a data writing period P23 for which an image data signal N+1th-d corresponding to the second frame 2Frame is sequentially written in each pixel of the display panel are continuously connected to each other.

According to an exemplary embodiment of the driving method of the display device of the present invention, the data writing and the light emitting for the predetermined frame are separated from each other, and the data writing is sequentially performed for each line of all the pixels and the light emitting is performed in all the pixels at the same time.

When differently describing the driving method of the display device of the present invention, in all the pixels of the display panel for one frame, the writing of the image data signal corresponding to the corresponding frame in sequence and the simultaneously emitting of the light at driving current according to the corresponding image data signal written in the previous frame of the corresponding frame are not temporally separated from each other, but occur at the same time. Accordingly, the data writing period may be ensured so as to be substantially the same as the one frame period, and the light emitting period may freely determine a starting point and an ending point in one frame regardless of the data writing period.

Figure 3:
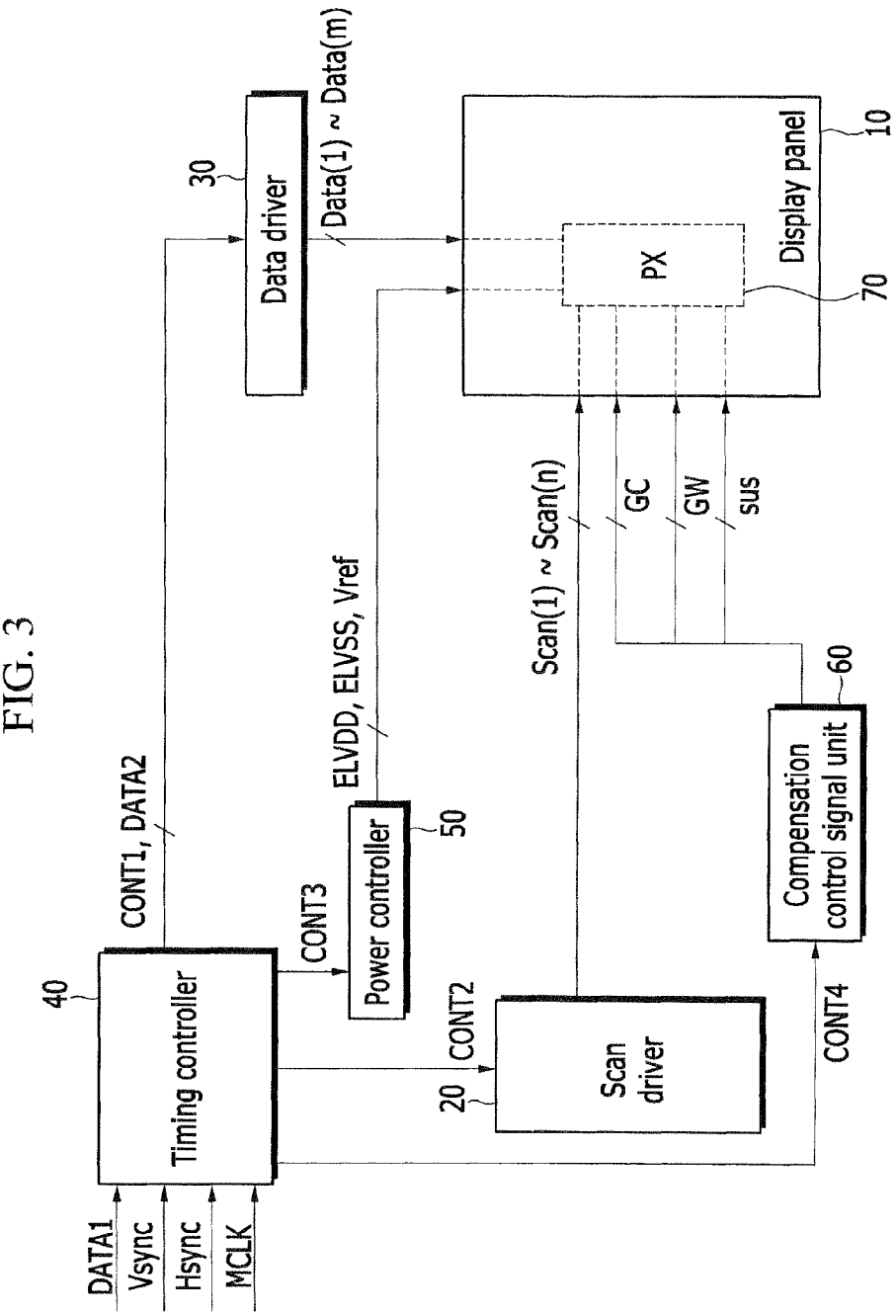
FIG. 3 is a block diagram illustrating a display device according to an exemplary embodiment of the present invention.

The configuration of the display device for applying the driving method of the display device of the present invention is illustrated in a block diagram of FIG. 3.

The display device according to the exemplary embodiment of FIG. 3 includes a display panel 10, a scan driver 20, a data driver 30, a timing controller 40, a power supply controller 50, and a compensation control signal unit 60.

The display panel 10 includes a plurality of pixels 70 which displays images by emitting light according to an image data signal DATA2 corresponding to an external image signal DATA1. The pixel 70 is connected to the corresponding data line among a plurality of data lines transferring a plurality of data signals data(1)-data(n) and the corresponding scan line among a plurality of scan lines transferring a plurality of scan signals scan(1)-scan(n). The plurality of data signals data(1)-data(n) are image data signals corresponding to the respective pixels, as image data signals generated through image processing processes such as luminance correction for the external image signal. Further, the plurality of scan signals scan(1)-scan(n) are signals activating the plurality of pixels so as to display images according to the data signals corresponding to the plurality of pixels included in the display panel.

Further, the pixel 70 is connected to a plurality of power supply lines transferring driving power supply voltages ELVDD and ELVSS.

The pixel 70 is connected to a corresponding first control signal line among the plurality of first control signal lines transmitting the plurality of first control signals GC, a corresponding second control signal line among the plurality of second control signal lines transmitting the plurality of second control signals GW, and a corresponding third control signal line among the plurality of third control signal lines transmitting the plurality of third control signals sus.

The plurality of first control signals GC are signals transferred to each pixel for compensating threshold voltage of the driving transistor, in order to improve non-uniformity of luminance due to a deviation of the threshold voltages of the driving transistors of all the pixels included in the display panel. In addition, the plurality of second control signals GW are signals for controlling operation of each pixel in relation with initialization process of the entire pixels included in the display panel, a threshold voltage compensation process of driving transistors of the respective pixels, and data transfer process of the entire pixels. In addition, the plurality of third control signals sus are signals for controlling operation of each pixel in relation with a process for transferring a data voltage according to an image data signal and writing data to the corresponding pixel in separation from the light emitting period according to the driving method of the display device.

Level control of the first control signal GC, the second control signal GW, the third control signal sus, the driving power voltage, and the reference voltage, and transferring process of the scan signal and the data signal will be described in further detail later in description of the driving process according to the exemplary embodiment of the present invention with reference to the accompanying drawings.

The scan driver 20 generates the plurality of scan signals scan(1)-scan(n) according to a scan control signal CONT2 to transfer the scan signals to the plurality of scan lines connected to the display panel. The scan control signal CONT2 controls the corresponding scan signal to be sequentially transferred to each of the plurality of pixels included in the display panel for each pixel line for the data writing period 3 of FIG. 2 of the driving period according to the driving method of the display device of the present invention.

The data driver 30 transfers the image data signal DATA2 corresponding to the external image signal DATA1 according to a data control signal CONT1 to the plurality of pixels of the display panel through the plurality of data lines Data(1)-Data (m), respectively. The data control signal CONT1 controls the corresponding image data signal to be sequentially transferred to each of the plurality of pixels activated by the scan signal for the data writing period 3 of FIG. 2 according to the driving method of the display device of the present invention. Then, each of the plurality of pixels activated by the scan signal stores the data voltage according to the corresponding image data signal to write the data.

In addition, the data driver 30 according to the exemplary embodiment of the present invention, may simultaneously transfer a predetermined voltage to each of the plurality of pixels before transferring a data voltage according to an image data signal according to a control of the data control signal CONT1.

In this case, the predetermined voltage may be changed (e.g., an on-bias voltage or a reset voltage) according to an embodiment of the driving method of the display device.

In further detail, the data driver 30 may transfer a low-level on-bias voltage during a period for transferring an on-bias voltage to a driving transistor of each pixel. In addition, the data driver 30 may transfer a reset voltage higher than the on-bias voltage during a period for resetting a pre-written voltage to a driving transistor of each pixel. The reset voltage may be transferred through the corresponding data line from the data driver 30 until an initialization period during which a gate electrode, a source electrode, and a drain electrode of a driving transistor of each pixel are set to a predetermined voltage.

The power controller 50 supplies a driving power source voltage (ELVDD, ELVSS) for driving each pixel through a power source line connected to each pixel of the display panel and a predetermined reference voltage Vref for stable operation in relation with a driving process of each pixel according to the power control signal CONT3.

Particularly, although it will be described later with reference to the accompanying drawing, the predetermined reference voltage Vref is applied to one side electrode of a sustain capacitor Chold of each pixel to maintain a data voltage corresponding to an image data signal in each pixel.

Meanwhile, the driving power source voltage includes the first power source voltage ELVDD having a predetermined high level and the second power source voltage ELVSS having a predetermined low level.

The power supply control signal CONT3 controls the voltage levels of the first power supply voltage ELVDD, the second power supply voltage ELVSS, and the reference voltage Vref to be controlled in the power supply controller 50 in response to each driving process. That is, as the driving process according to the exemplary embodiment of the present invention illustrated in FIG. 2, the power supply controller 50 determines the levels of the first power supply voltage ELVDD, the second power supply voltage ELVSS, and the reference voltage Vref by the power supply control signal CONT3 according to the reset period 1, the threshold voltage compensating period 2, the data writing period 3, and the light emitting period 4 to supply the determined levels to the power supply line.

The compensation control signal unit 60 generates and transfers the plurality of first control signals GC, the plurality of second control signals GW, and the plurality of third control signals sus to the plurality of pixels of the display panel according to a compensation control signal CONT4. According to the exemplary embodiment, the compensation control signal CONT4 may include a first compensation control signal determining pulse voltage levels of the plurality of first control signals GC in response to the driving period according to the driving method of the present invention, a second compensation control signal determining pulse voltage levels of the plurality of second control signals GW, and a third compensation control signal determining pulse voltage levels of the plurality of third control signals sus.

The timing controller 40 generates the corresponding image data signal DATA2 from the external image signal DATA1 and controls functions and driving of the respective elements of the display device. In detail, the timing controller 40 classifies the image signal DATA1 into a frame unit according to a vertical synchronization signal Vsync and classifies the image signal DATA1 into a pixel line (scan line) unit according to a horizontal synchronization signal Hsync and processes the external image signal DATA1 to generate an image data signal DATA2. The image data signal DATA2 is transmitted to the data driver 30 together with the data control signal CONT1.

The image signal DATA1 and the vertical synchronization signal Vsync, the horizontal synchronization signal Hsync, and a synchronization signal of the main clock signal MCLK are processed from the external input signal.

The image signal DATA1 is a signal processed to the image signal corresponding to the corresponding frame by classifying the external input signal into each frame unit. In some cases, the image signal DATA1 may include image signals corresponding to a left-eye view point and a right-eye view point for implementing the 3D stereoscopic image. In the case of the exemplary embodiment, the timing controller 40 arranges an image data signal of a first view point (left eye or right eye) and an image data signal of a second view point (right eye or left eye) from the external input signal according to vertical synchronization and horizontal synchronization to generate image data signals.

According to an exemplary embodiment of the driving method of the present invention illustrated in FIG. 2, since the data writing and the light emitting are simultaneously performed in the display panel, the entire scan period for the display panel as the data writing period 3 may occur for a period almost close to one frame 60 Hz. Therefore, the vertical synchronization signal Vsync may be transferred every scan period close to one frame. Further, the horizontal synchronization signal Hsync may be set as a frequency required to activate all the pixels for the data writing period 3 around the pixel line, as a frequency determined according to the data writing period 3 which is the scan period of the one frame period.

The main clock signal MCLK may be one of a clock signal having a basic frequency included in the external input signal or a clock signal generated by a proper pre-processing.

Figure 4:
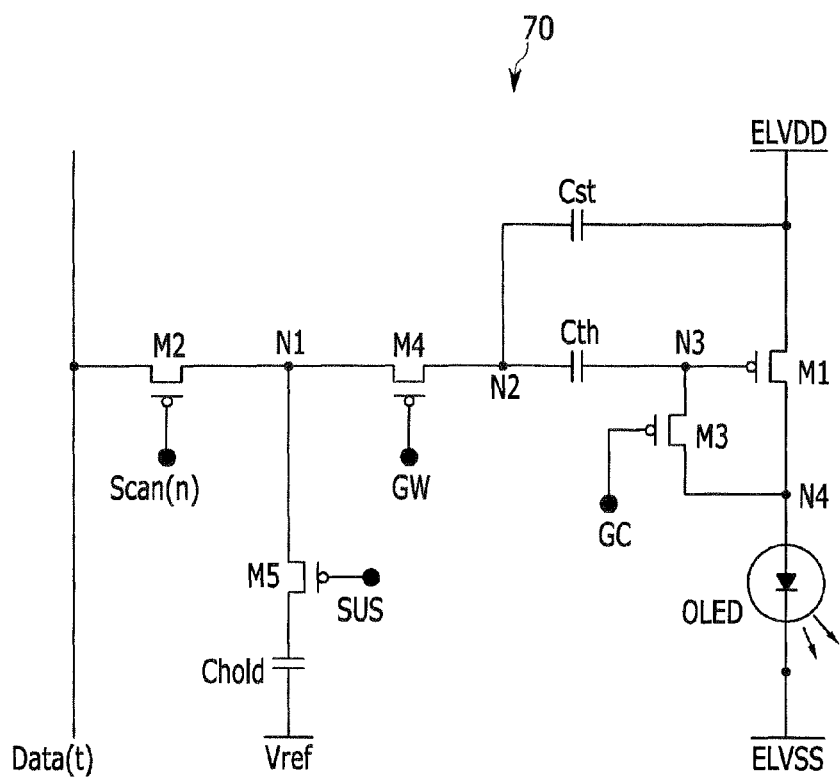
FIG. 4 is a circuit diagram illustrating an exemplary embodiment of a structure of a pixel included in the display device of FIG. 3.

FIG. 4 is a circuit diagram illustrating a structure of the pixel 70 included in the display device of FIG. 3.

Referring to FIG. 4, the pixel 70 included in the display panel 10 of the display device according to the exemplary embodiment of the present invention includes an organic light emitting diode (OLED) emitting light according to an image data signal and a driving circuit. The driving circuit includes five transistors including a first transistor M1, a second transistor M2, a third transistor M3, a fourth transistor M4, and a fifth transistor M5 and three capacitors including a storage capacitor Cst, a compensation capacitor Cth, and a sustain capacitor Chold.

In general, in order to apply a driving technique of the display device, the pixel circuit may be configured by five to eight transistors and two to three capacitors. In addition, a power supply wire for applying reference voltage or initial voltage of the capacitor may need to be additionally ensured in order to store the data voltage for one frame. A production yield of the display device is decreased and ensuring of an aperture ratio is disadvantageous due to the complicated structure of the pixel circuit and the additional power supply wire of the display device in the related art. Further, in the case where the voltage is not stably and smoothly supplied through the power supply wire, screen uniformity of the display image of the display panel deteriorates.

Accordingly, in order to solve the problem and apply the driving method of FIG. 2, the display device of the present invention includes a simple pixel circuit of FIG. 4 including five transistors and three capacitors. In particular, according to the pixel circuit structure of FIG. 4, an on-bias voltage can be applied to the driving transistor of the pixel using a data line that applies a data voltage so that it is advantageous to improve a response waveform compared to a conventional pixel circuit, and an image with highly reliable quality can be displayed.

The pixel 70 illustrated in FIG. 4 represents a pixel included in an n-th pixel line among all pixels of the display panel. Accordingly, although not illustrated in FIG. 4, the pixel 70 is connected to a scan line corresponding to an n-th pixel row and a data line corresponding to a predetermined pixel column (hereinafter, assumed as an m-th pixel column) among the pixels corresponding to an n-th pixel row.

Referring to FIG. 4, the first transistor M1 of the pixel 70 is a driving transistor includes a drain electrode connected with an anode of the organic light emitting diode OLED at node N4, a gate electrode connected to a third node N3 connected with one electrode of the third transistor M3, and a source electrode connected to the first power supply voltage ELVDD. The driving transistor M1 controls driving current supplied to the organic light emitting diode (OLED) as current according to an image data signal corresponding to each pixel.

The second transistor M2 is a switching transistor M2 includes a source electrode connected to the data line corresponding to the m-th pixel column, a gate electrode connected to the scan line corresponding to the n-th pixel row, and a drain electrode connected to a first node N1 connected with the fifth transistor M5. The switching transistor M2 is activates the corresponding pixel in response to the corresponding scan signal Scan(n) applied to the gate electrode. That is, the corresponding scan signal Scan(n) is inputted to the gate electrode of the switching transistor M2, and as a result, the corresponding image data signal Data(t) is transferred from the data line through the source electrode of the switching transistor M2 of the activated pixel.

The third transistor M3 is a compensation transistor including a gate electrode connected to the first control signal line to which the first control signal GV is transferred and two electrodes respectively connected to the drain electrode at node N4 and the gate electrode of the first transistor M1 at node N3, and compensates a threshold voltage of the first transistor M1. The compensation transistor M3 diode-connects the drain electrode and the gate electrode of the driving transistor M1 in response to the first control signal GC transferred at a predetermined pulse voltage level for a period of compensating the threshold voltage of the driving transistor in the driving method according to the exemplary embodiment of the present invention.

The fourth transistor M4 includes a gate electrode connected to the second control signal line to which the second control signal GW is transferred, a source electrode connected to the first node N1, and a drain electrode connected to a second node N2 to which the respective electrodes of the storage capacitor Cst and the compensation capacitor Cth are connected in common. The fourth transistor M4 transfers a voltage applied to the first node N1 to the second node N2 in response to the second control signal GW transmitted with a predetermined pulse voltage level during the initialization period, the threshold voltage compensation period, and the data transfer period in the driving method according to the exemplary embodiment of the present invention.

The fifth transistor M5 includes a gate electrode connected to the third control signal line to which the third control signal sus is transferred and two electrodes respectively connected to the first node N1 and the sustain capacitor Chold. The fifth transistor M5 transfers a voltage stored in the sustain capacitor Chold to the first node N1 in response to the third control signal sus which is controlled at a predetermined pulse voltage level correspondingly to each driving period in the driving method according to the exemplary embodiment of the present invention.

The transistors of the pixel circuit illustrated in FIG. 4 are configured by PMOS types, but are not limited thereto and may be configured by NMOS type transistors.

Meanwhile, the storage capacitor Cst of the pixel 70 illustrated in FIG. 4 includes a first electrode connected to the second node N2 and a second electrode connected to a supply source supplying the first power source voltage ELVDD The storage capacitor Cst stores a data voltage applied to the second node N2 during the data writing period as a predetermined voltage that corresponds to voltage division according to the connection with the compensation capacitor Cth. The data voltage applied to the second node N2 is a data voltage corresponding to an image data signal stored in the sustain capacitor Chold, and applied to the second node N2 through the fifth transistor M5 and the fourth transistor M4 during the data transfer period.

The storage capacitor Cst writes and stores data voltage according to the image data signal corresponding to the predetermined frame as a voltage corresponding to a capacitance ratio of the connected compensation capacitor Cth, while the organic light emitting diode (OLED) emits light at driving current according to the image data signal corresponding to the previous frame of the predetermined frame.

The compensation capacitor Cth includes a first electrode connected to the second node N2 and a second electrode connected to a third node N3 to which that gate electrode of the first transistor M1 is connected. The compensation capacitor Cth maintains a voltage applied to the third node N3 to which the gate electrode of the first transistor M1 is connected, that is, a voltage considering the threshold voltage of the first transistor M1 during the threshold voltage compensation period according to the driving method of the exemplary embodiment of the present invention.

Meanwhile, the sustain capacitor Chold includes a first electrode connected to the supply source supplying the predetermined reference voltage Vref and a second electrode connected to the first electrode of the fifth transistor M5. The sustain capacitor Chold writes a data voltage according to an image data signal to be displayed in the next frame while an organic light emitting diode OLED of each pixel emits light with a driving current according to an image data signal.

Hereinafter, functions and operations of respective circuit elements included in the pixel 70 illustrated in FIG. 4 will be described for each driving period according to the driving method of the display device with reference to a driving waveform diagram of FIG. 5.

Figure 5:
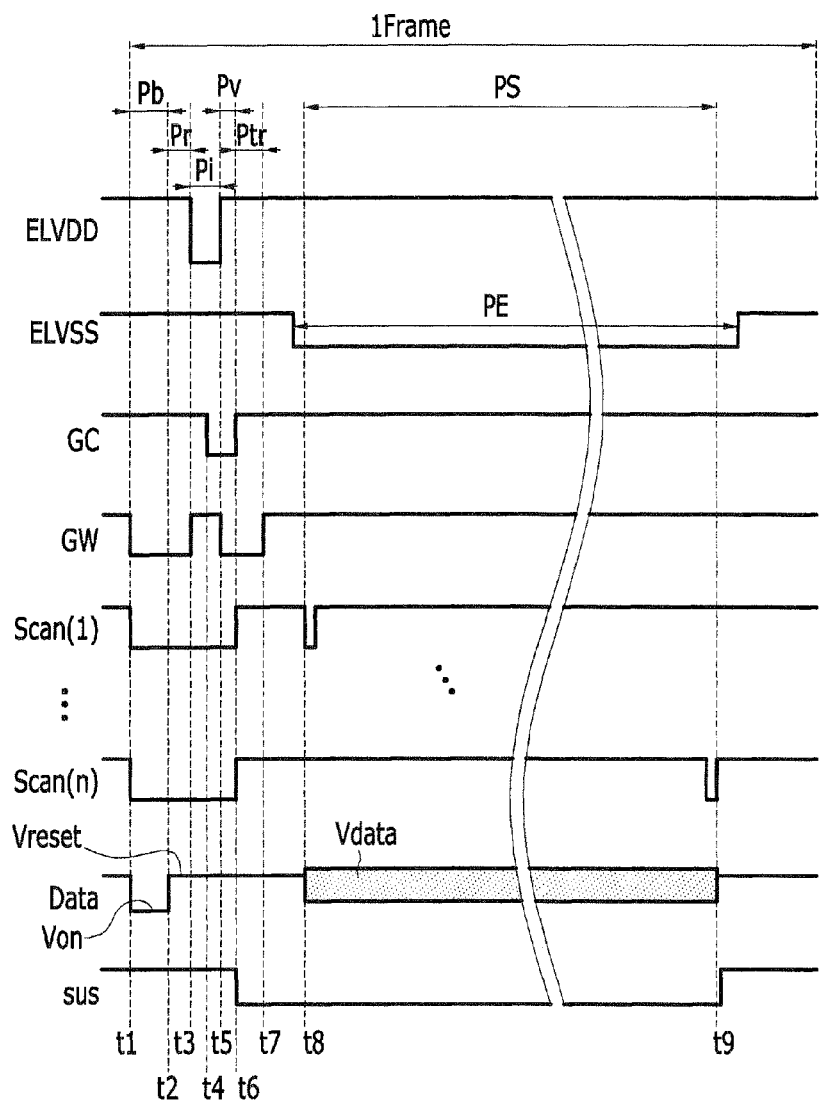
FIG. 5 is a driving waveform diagram of the pixel of the FIG. 4.

FIG. 5 illustrates a voltage level of driving power supply voltage and pulse voltage levels of signals transferred through power supply lines or signal wires in order to operate each pixel for each driving period according to the driving method of the display device of the present invention.

FIG. 5 illustrates voltage waveforms of the first power supply voltage ELVDD, the second power supply voltage ELVSS, the first control signal GC, the second control signal GW, and the third control signal sus, which are transferred to each pixel for one frame. In addition, FIG. 5 illustrates scan signals scan(1)-scan(n) which are sequentially transferred to all the pixels along the pixel line and data voltage Data transferred through the data line corresponding to the corresponding pixel.

Driving order and process of the driving method according to the exemplary embodiment of FIG. 5 are similar to those of the driving method illustrated in FIG. 2, but the driving method according to the exemplary embodiment further include an on-bias period Pb before a reset period Pr and an initialization period Pi between a reset period Pr and a threshold voltage compensating period Pv unlike FIG. 2. In addition, a data transfer period Ptr is further included between the threshold voltage compensation period Pv and a data writing period Ps.

First, a period of a time t1 to a time t2 is the on-bias period Pb. In this case, the scan signals Scan(1) to Scan(n) transmitted to the respective pixels are simultaneously transferred as low-level pulse voltages. In addition, the second control signal GW is also transferred as a low-level pulse voltage.

Then, the second transistor M2 and the fourth transistor M4, that are switching transistors, are turned on and the data lines connected to the respective pixels and wiring of the second node N2 are electrically connected. During the period Pb, an on-bias voltage Von having a predetermined low-level is applied through a data line connected to each pixel, and the low-level on-bias voltage Von is transferred to the second node N2 through the second transistor M2 and the fourth transistor M4. In this case, since the first power source voltage ELVDD and the second power source voltage ELVSS are high level, the low-level on-bias voltage Von is applied to the first transistor M1, which is a driving transistor. A voltage value of the on-bias voltage Von is not specifically restrictive, but may substantially be 0V. A response waveform of each pixel can be improved by the predetermined on-bias voltage applied to the first transistor M1.

The on-bias period Pb is terminated at the time t2 at which the voltage Data applied through the data line connected to each pixel is increased to high level.

A period from the time t2 at which the on-bias period Pb is terminated to a time t3 is the reset period Pr. The scan signal Scan(1) to Scan(n) and the second control signal GW are transferred while maintaining the low-level pulse voltage during the reset period Pr.

The voltage Data applied through the data line connected to each pixel is increased to high level during the reset period Pr, and the increased voltage is transferred as the reset voltage Vreset to the second node N2 and the third node N3 to reset a gate electrode voltage of the driving transistor M1. A value of the high-level reset voltage Vreset is not specifically limited, but is included within a voltage range according to an image data signal and the range may substantially be 6V to 13V.

Next, the second control signal GW is increased to high level at the time t3, and, at the same time, the first power source voltage ELVDD is changed to low level and then transferred. The low level voltage value of the first power source voltage ELVDD is not specifically limited, but it may substantially be 0V.

A period from the time t3 to a time t5 is the initialization period Pi. When the second control signal GW is increased to high level during the initialization period Pi, the fourth transistor M4 is turned off and voltages of the second node N2 and the third node N3 are decreased due to the first power source voltage ELVDD applied as low level. Then, the driving transistor M1 of which the gate electrode is connected to the third node N3 is turned on and thus a voltage of the fourth node N4 is decreased to the low level voltage of the first power source voltage.

The first control signal GC is decreased to low level and then transferred at a time t4 during the initialization period Pi. Then, the third transistor M3, which is the compensation transistor, is turned on. Thus, the drain electrode and the gate electrode of the driving transistor M1 are diode-connected.

In such a state, the second control signal GW is decreased back to low level at the time t5 and the voltage level of the first power source voltage ELVDD is changed to high level. A voltage value of the high-level first power source voltage ELVDD is not specifically limited, but it may substantially be 12V.

A period from the time t5 to a time t6 is the threshold voltage compensation period Pv. During this period, the scan signals Scan(1) to Scan(n) are transmitted as low level.

Since the compensation transistor M3 is in the turn-on state during the threshold voltage compensation period Pv, the fourth node N4 connected with the drain electrode of the driving transistor M1 and the third node N3 of connected with the gate electrode of the driving transistor M1 are diode-connected, and the voltage of the third node N3 and the voltage of the fourth node N4 are maintained with values in consideration of the threshold voltage (hereinafter, Vth) of the driving transistor M1 and the voltage value of the first power source voltage ELVDD.

That is, the voltage of the third node N3 and the voltage of the fourth node N4 are maintained with the sum (ELVDD+Vth) of the high-level first power source voltage ELVDD and the threshold voltage Vth due to the driving transistor M1 and the compensation transistor M3 that are in the turn-on state.

Since the fourth transistor M4 is turned on by the second control signal GW shifted and then transferred at the time t5, the voltage of the second node N2 can be maintained with a predetermined high-level reset voltage Vreset applied to a data wire of each pixel.

Next, a period from the time t6 to a time t7 is the data writing period Ptr.

The first control signal GC and the scan signal Scan(1) to Scan(n) are increased to high level at the time t6, and the third control signal sus maintained in high level before the time t6 is decreased to low level and then transferred at the time t6. The second control signal GW is transferred still in the low level. Then, while the fourth transistor M4 is in the turn-on state, the third transistor M3 and the second transistor M2 are turned off and the fifth transistor M5 is turned on. A voltage according to an image data signal stored in the sustain capacitor Chold in the previous frame is applied to the first node N1 through the fifth transistor M5. For better understanding and ease of description, a data voltage according to an image data signal written to the present frame is referred to as Vdata and a data voltage according to an image data signal written in the previous frame and stored in the sustain capacitor Chold is referred to as Vdata_0.

Thus, the data voltage Vdata_0 of the previous frame, applied to the first node N1 through the fifth transistor M5 should be transferred to the second node N2 through the turn-on fourth transistor M4, but a voltage transferred to the second node N2 is given as Equation 1 due to the storage capacitor Cst and the compensation capacitor Cth connected to the second node N2.

Voltage of second node $N2V\_N2$=Voltage of previous second node $N2$+Voltage change amount of second node $N2*[C\_hold/(C\_hold+Cx)]=Vreset+(Vdata\_0-Vreset)*\alpha$  Equation 1

Here, $\alpha=C\_hold/(C\_hold+Cx)$ and $Cx=C\_st+C\_th$

C_st is capacitance of the storage capacitor, C_th is capacitance of the compensation capacitor, and C_hold is capacitance of the sustain capacitor.

The voltage of the second N2 is applied as the reset voltage Vreset transferred to each pixel through the data line through the reset period Pr, and when the voltage of the second N2 is changed as much as a difference with the data voltage Vdata_0 stored in the previous frame, the voltage change amount is determined in the sustain capacitor Chold with reflection of a ratio between the capacitances of the storage capacitor Cst, the compensation capacitor Cth, and the sustain capacitor Chold that are commonly connected to the second node N.

In addition, the voltage of the third node N3 is maintained with the voltage (ELVDD+Vth) that is equivalent to a voltage increased from the threshold voltage Vth of the driving transistor to the high-level first power source voltage ELVDD and then changed with reflection of the voltage change amount of the second node N2.

The voltage of the third node N3 is given as Equation 2.

Voltage of the third node $N3$ $V\_N3$=Voltage of previous third node $N3$+voltage change amount of second node $N2*[C\_hold/(C\_hold+Cx)]$
$=ELVDD+Vth+(Vdata\_0-Vreset)*\alpha$   Equation 2

(Capacitance of other parasitic capacitor will be ignored)
Here, $\alpha=C\_hold/(C\_hold+Cx)$, $Cx=C\_st+C\_th$ Subsequently, while the pulse voltage of the third control signal sus is in the low level, the corresponding scan signal among the scan signals Scan(1) to Scan(n) is transferred while sequentially changed to low level for each line to the second transistor M2 of each pixel from a time t8. A period from the time t8 to a time t9 is a data writing period PS during which the respective pixels are activated by sequentially transferring the scan signals Scan(1) to Scan(n) to each pixel line and a data voltage Vdata according to an image data signal of the corresponding frame is written.

In further detail, the scan signal is transferred to the second transistor M2 of each pixel while being changed to low level pulse voltages from the first scan signal Scan(1) to the last scan signal Scan(n), and the second transistors M2 of the respective pixels are sequentially turned on to receive a data voltage Vdata according to an image data signal of the corresponding frame through a data line to which the source electrode of the second transistor M2 is connected. Thus, the data voltage Vdata according to the image data signal is stored in the sustain capacitor Chold through the fifth transistor M5 in the turn-on state.

Meanwhile, during a period equivalent to or longer than the data writing period PS, each pixel displays an image with a driving current corresponding to a data voltage Vdata_0 of an image data signal written in the previous frame. That is, the light emitting period and the data writing period are simultaneously performed in the driving method according to the exemplary embodiment of the present invention.

Referring to FIG. 5, the light emitting period PE during which the respectively pixels simultaneously emit light with a driving current according to an image data signal written in the previous frame is longer than the data writing period PS during which an image data signal of the corresponding frame is written. In some cases, the light emitting period PE and the data writing period PS may exist at the same time.

In further detail, the light emitting period PE starts as the voltage level of the second power source voltage ELVSS is changed to low level before the time t8 when the data writing period PS starts. The low level voltage of the second power source voltage ELVSS is not specifically limited, but may be 0V or less.

Then, a voltage of the cathode of the organic light emitting diode to which the second power source voltage ELVSS is applied is changed to low level, and accordingly the driving current flows toward the organic light emitting diode OLED included in each pixel of the display panel of the display device. The driving current corresponds to the data voltage Vdata_0 of the image data signal transferred from the previous frame. Then, for the light emitting period PE, images according to the image data signal transferred to the previous frame may be simultaneously expressed in the entire display panel.

A driving current I_OLED flowing to the organic light emitting diode OLED for the light emitting period PE is as follows.

$$I\_OLED = k(Vgs - Vth)^2 \quad \text{Equation 3}$$

$$= k(ELVDD + Vth + (Vdata\_0 - Vreset)*\alpha - ELVDD - Vth)^2$$

$$= k[\alpha*(Vdata\_0 - Vreset)]^2$$

Here, k is a proportional constant according to a material characteristic of the driving transistor.

According to Equation 3, the display images which emit light simultaneously in all the pixels of the display panel for the light emitting period PE is not influenced by threshold voltage Vth of the driving transistor and the voltage level of the first power supply voltage ELVDD, and a driving current according to an image data signal flows and thus uniform images may be displayed.

As such, the driving process of the exemplary embodiment of the present invention, since the light emitting and the data writing are simultaneously performed in one frame, scanning is not performed at about 240 Hz for high driving, but may be performed at a speed close to 60 Hz throughout the time of one frame, and as a result, the data writing period may be ensured while the light is simultaneously emitted. In the case of driving of the stereoscopic image display, the scan period for implementing each view point image may be ensured at a speed close to 120 Hz.

In addition, compared to a conventional pixel circuit formed of five transistors and three capacitors, the pixel circuit according to the exemplary embodiment of the present invention applies a low on-bias voltage to the driving transistor M1 using a voltage applied through the data line so that a response waveform of each pixel can be further improved than the conventional pixel circuit.

Figure 6:
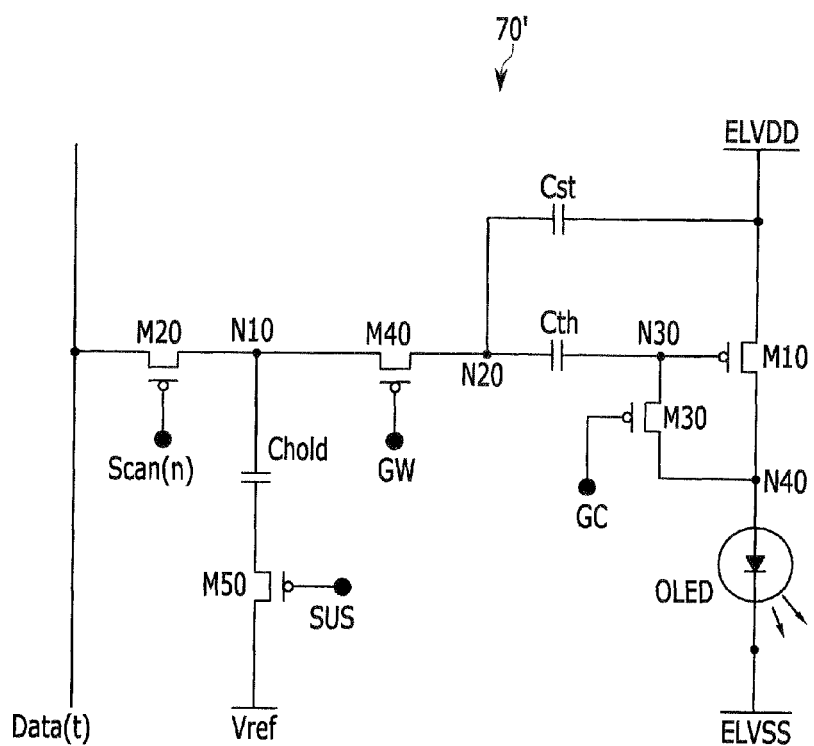
FIG. 6 is a pixel circuit diagram of an exemplary embodiment that is partially changed from the pixel structure of FIG. 4.

FIG. 6 is a circuit diagram of a pixel 70' according to exemplary variation that is partially changed from the pixel structure of FIG. 4.

A structure of the pixel 70' of FIG. 6 is formed of an organic light emitting diode OLED and a driving circuit, and like the pixel circuit of FIG. 4, the driving circuit includes first to fifth transistors M10 to M50, a storage capacitor Cst, a compensation capacitor Cth, and a sustain capacitor Chold.

However, a location of the sustain capacitor Chold and a location of the fifth transistor M50 are switched in the pixel illustrated in FIG. 6 compared to the structure of FIG. 4. That is, a first electrode of the sustain capacitor Chold is connected to a first electrode of the fifth transistor M50 and a second electrode of the sustain capacitor Chold is connected to a first node N1. In addition, the fifth transistor M50 includes a gate electrode connected to the third control signal line that transfers the third control signal sus, the first electrode connected to the first electrode of the sustain capacitor Chold, and the second electrode connected to the power line supplying a reference voltage Vref.

A driving waveform of the pixel illustrated in FIG. 6 is equivalent to the driving timing diagram of FIG. 5, and like driving of the pixel of FIG. 4, the pixel of FIG. 6 is driven through an on-bias period Pb, a reset period Pr, an initialization period Pi, a threshold voltage compensation period Pv, a data transferring period Ptr, a data writing period PS, and a light emitting period PE, and therefore no further description will be provided.

Figure 7:
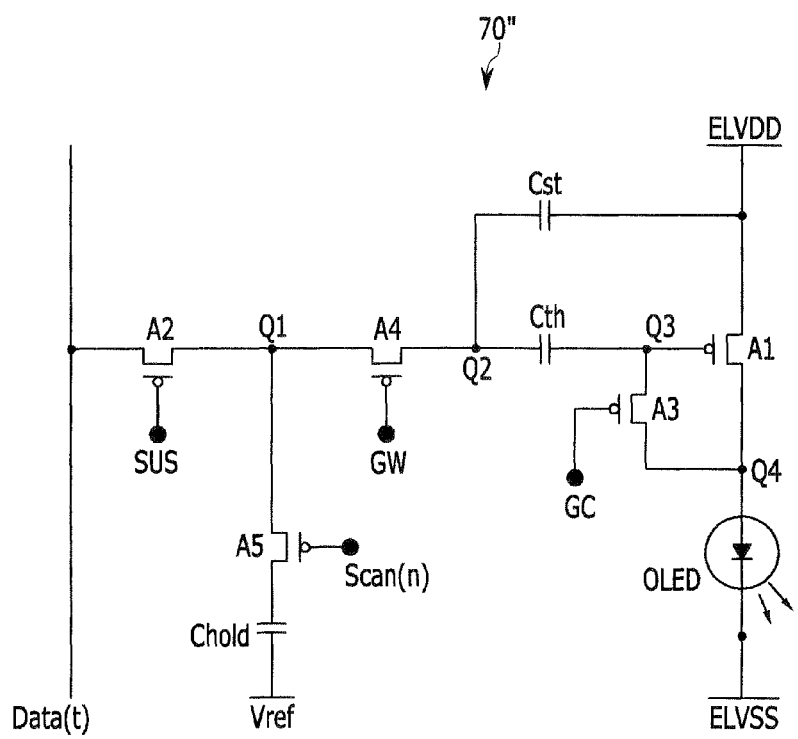
FIG. 7 is a circuit diagram of another exemplary embodiment of the pixel structure included in FIG. 3.
Figure 8:
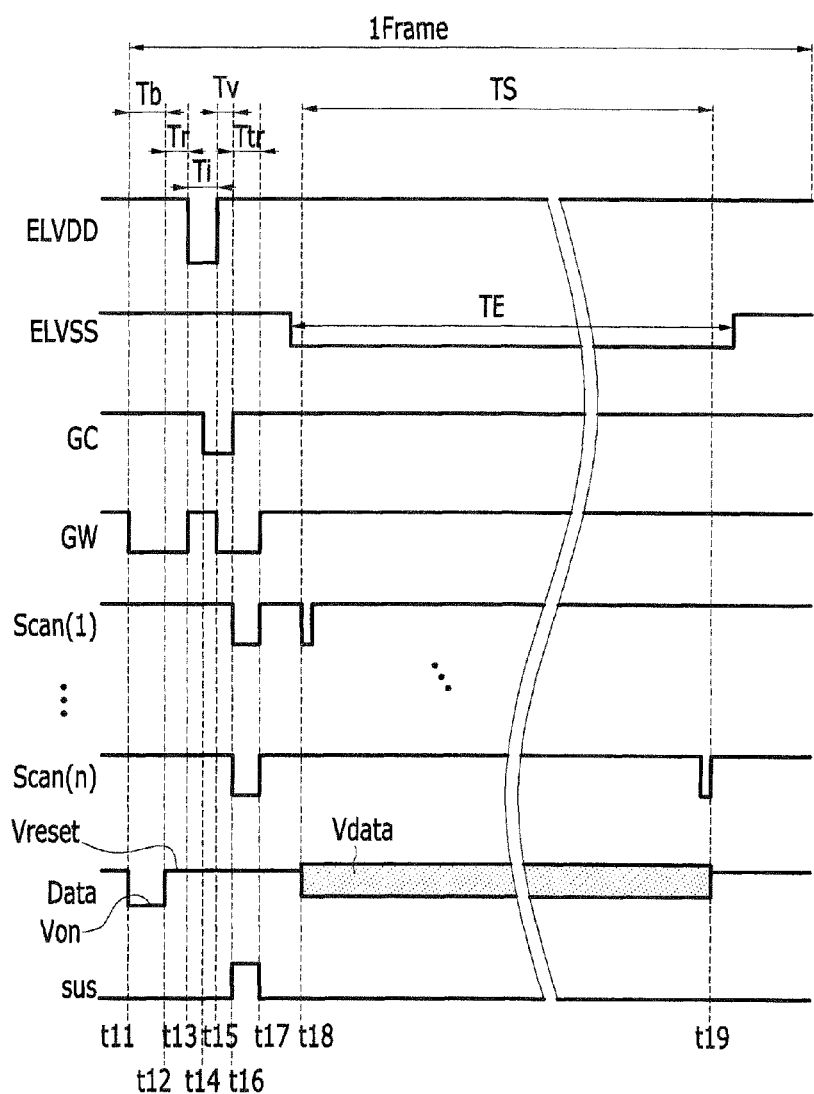
FIG. 8 is a driving waveform diagram of the pixel of FIG. 7.

A pixel structure and a driving waveform of a pixel of a display device according to another exemplary embodiment of the present invention are respectively illustrated in FIG. 7 and FIG. 8. Functions and operations of respective circuit elements included in a pixel 70'' illustrated in FIG. 7 will be described for each driving period according to the driving method of the display device with reference to a driving waveform diagram of FIG. 8.

However, the structure of the pixel 70" according to the exemplary embodiment of FIG. 7 is partially changed from the structure of the pixel of FIG. 4, and almost similar thereto. That is, the structure of the pixel 70" of the exemplary embodiment of FIG. 7 is formed of an organic light emitting diode OLED and a driving circuit, and like the pixel structure of FIG. 4, the driving circuit includes first to fifth transistors A1 to A5, a storage capacitor Cst, a compensation capacitor Cth, and a sustain capacitor Chold.

However, in the pixel 70" of FIG. 7, the third control signal line transferring the third control signal sus and a transistor connected to a scan line transferring a scan signal Scan(n) are switched compared to the pixel of FIG. 4. That is, in the pixel of FIG. 7, a gate electrode of the second transistor A2 is connected to the third control signal line transferring the third control signal sus and a gate electrode of the fifth transistor A5 is connected to the corresponding scan line transferring the corresponding scan signal Scan(n).

In the pixel of FIG. 7, configuration and connection of other circuit elements, excluding wires to which the gate electrode of the second transistor A2 and the gate electrode of the fifth transistor A5 are the same as those of the pixel structure of FIG. 4, and therefore no further description will be provided.

A driving process of the pixel 70" of FIG. 7 can be described with reference to the waveform diagram of FIG. 8. As shown in FIG. 8, the pixel 70" of FIG. 7 is also driven through an on-bias period Tb, a reset period Tr, an initialization period Ti, a threshold voltage compensation period Tv, a data transferring period Ttr, a data writing period TS, and a light emitting period TE, and a signal in each period and a waveform of a power source voltage are almost similar to the waveform diagram of FIG. 5 that expresses the pixel driving waveform of FIG. 4. However, since the signal wires connected to the gate electrode of the second transistor A2 and the gate electrode of the fifth transistor A5 are switched, scan signals Scan(1) to Scan(n) and a pulse waveform of the third control signal sus transferred to the respective pixels are different. The following descriptions cover only the difference.

The third control signal sus applied to the gate electrode of the second transistor A2 maintains low level during the on-bias period Tb, the reset period Tr, the initialization period Ti, and the threshold voltage compensation period Tv, and then increases to high level during the data transferring period Ttr that starts from a time t16 to a time t17. Then, the third control signal sus maintains the low level during data writing period TS and the light emitting period TE.

The scan signals Scan(1) to Scan(n) applied to the gate electrode of the fifth transistor A5 of each pixel maintain high level during the on-bias period Tb, the reset period Tr, the initialization period Ti, and the threshold voltage compensation period Tv, and decrease to low level during the data transferring period Ttr (i.e., the time t16 to the time t17). In addition, low-level pulse voltages are sequentially transferred to the respective pixels for each pixel line during the data writing period TS that starts from a time t18 to a time t19.

The second transistor A2 turned on during the on-bias period Tb, the reset period Tr, the initialization period Ti, and the threshold voltage compensation period Tv receives a predetermined on-bias voltage Von and a reset voltage Vreset through a data line connected to a source electrode of the second transistor A2 and transfers the received voltages to a second node Q2, except that transistor A4 is turned off during initialization period Ti, thus the reset voltage Vreset is not transferred to second node Q2 during the initialization period Ti.

The second transistor A2 is turned off during the data transferring period Ttr, and a data voltage Vdata_0 written to the previous frame through the turn-on fifth transistor A5 and stored in the sustain capacitor Chold is transferred to the second node Q2 during the data transferring period Ttr.

Meanwhile, a data voltage Vdata according to an image data signal of the corresponding frame is sequentially written to and stored in a sustain capacitor Chold in each pixel of each pixel line during the data writing period TS. That is, the second transistor A2 maintains the turn-on state according to the third control signal sus maintaining low level and then applied during the data writing period TS. In addition, the fifth transistor A5 turned on in response to the scan signals Scan(1) to Scan(n) sequentially applied as low level to the respective pixels of each pixel line stores the data voltage Vdata transferred to the first node Q1 through the data line in the sustain capacitor Chold.

The amount of driving current for light emission in each pixel can be calculated through Equation 1 to Equation 3, and therefore no further description will be provided.

Figure 9:
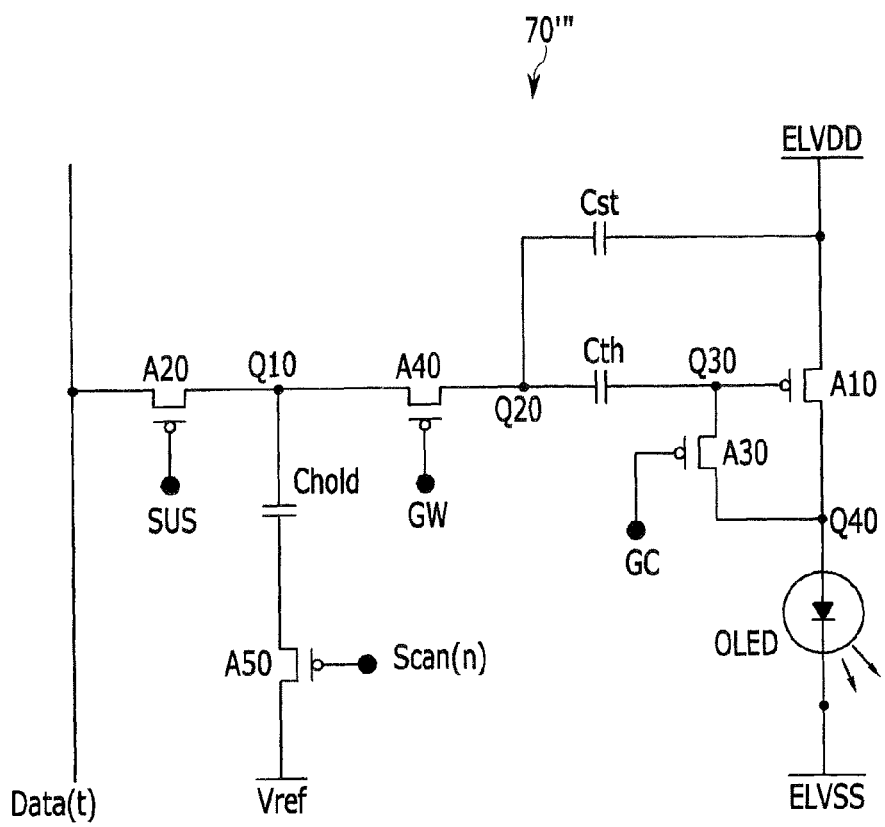
FIG. 9 is a pixel circuit diagram of an exemplary embodiment that is partially changed from the pixel structure of FIG. 7.

FIG. 9 is a pixel circuit diagram according to an exemplary variation that is partially changed from the pixel structure of FIG. 7.

The structure of the pixel 70''' of FIG. 9 is formed of an organic light emitting diode OLED and a driving circuit, and like the circuit structure of FIG. 7, the driving circuit includes first to fifth transistors A10 to A50, a storage capacitor Cst, a compensation capacitor Cth, and a sustain capacitor Chold.

However, compared to the structure of FIG. 7, a location of the sustain capacitor Chold and a location of the fifth transistor A50 are switched in the pixel of FIG. 9. That is, a first electrode of the sustain capacitor Chold is connected to a first electrode of the fifth transistor A50 and a second electrode thereof is connected to a first node Q10. In addition, the fifth transistor A50 includes a gate electrode connected to the corresponding scan line that transfers the corresponding scan signal Scan(n), the first electrode connected to the first electrode of the sustain capacitor Chold, and a second electrode connected to a power line supplying a reference voltage Vref.

The driving waveform of the pixel of FIG. 9 is the same as the driving timing waveform of FIG. 8, and the pixel of FIG. 9 is driven through an on-bias period Pb, a reset period Pr, an initialization period Pi, a threshold voltage compensation period Pv, a data transferring period Ptr, a data writing period PS, and a light emitting period PE, like the driving of the pixel of FIG. 7, therefore no further description will be provided.

Figure 10:
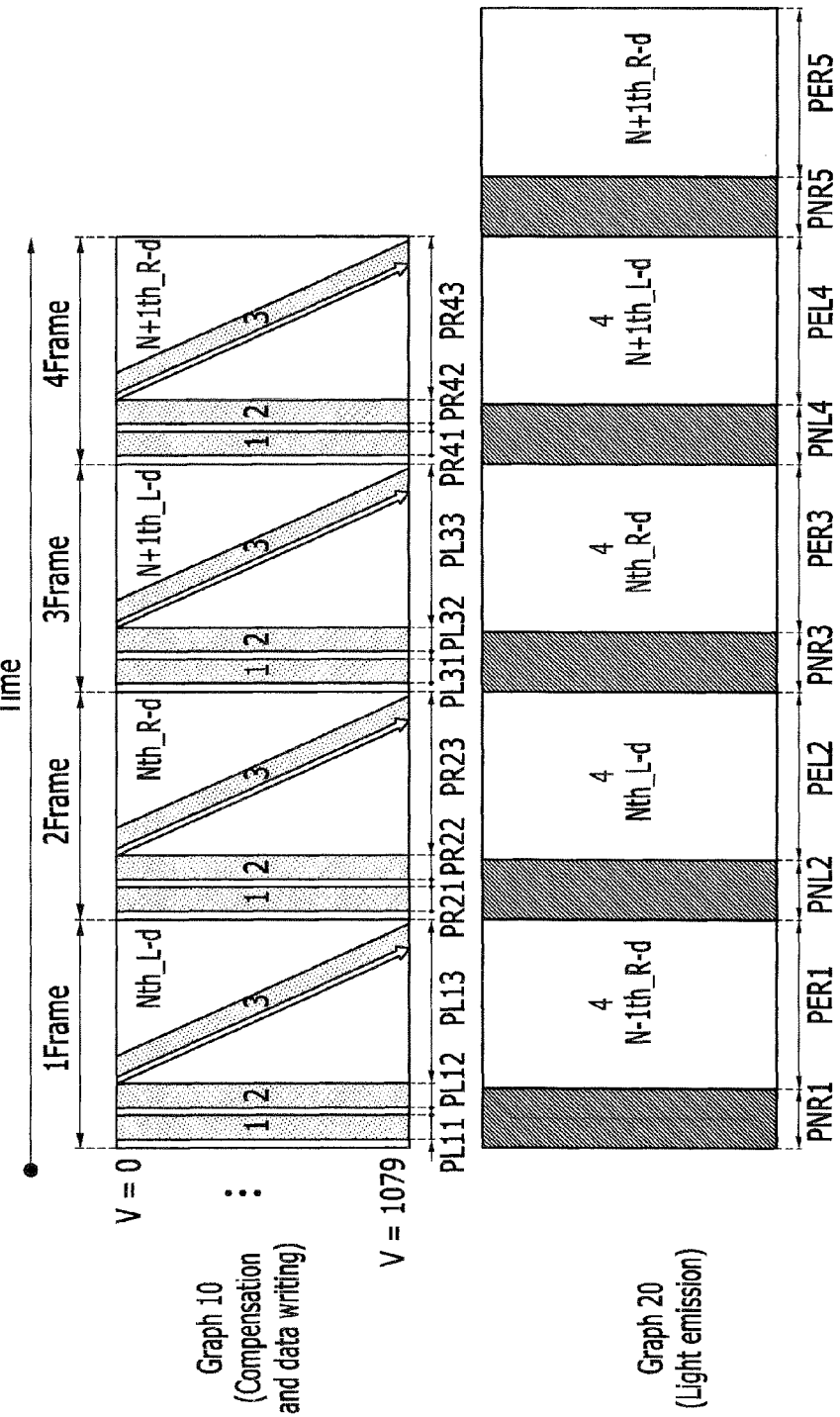
FIG. 10 shows a driving method of a display device according to another exemplary embodiment of the present invention.

FIG. 10 shows a diagram illustrating a driving method which displays a 3D stereoscopic image, as a driving method of a display device according to another exemplary embodiment of the present invention.

Like the driving method of FIG. 2, in FIG. 10, a Graph 10 representing compensating of a threshold voltage and writing of data for the same time and a Graph 20 representing emitting of light are separately illustrated.

In FIG. 10, one view point (left eye or right eye) image is displayed for every one frame. However, it is only an exemplary embodiment and is not limited thereto. That is, the display device may be driven so as to display different view point image at once in one frame. The driving method according to an embodiment of the present invention may be equally applied even to the high-speed stereoscopic image driving method.

Referring to FIG. 10, each of a plurality of frames includes a reset period 1, a threshold voltage compensation period 2, a data writing period 3, and a light emitting period 4, and the data writing period 3 and the light emitting period 4 are simultaneously performed. That is, referring to the Graph 10 illustrated from the viewpoint of the compensating and the data writing, for the subsequent frame, the reset period 1, the threshold voltage compensating period 2, and the data writing period 3 of writing data voltage according to a first view point (left eye or right eye) image data signal, and the reset period 1, the threshold voltage compensating period 2, and the data writing period 3 of writing data voltage according to a second view point (right eye or left eye) image data signal are repeated.

As another embodiment, an on-bias period, an initialization period, and a data transferring period may be further included in the driving process.

Meanwhile, referring to the Graph 20 illustrated from the viewpoint of the light emitting, for the subsequent frame, a non-light emitting period and a light emitting period of emitting light by all pixels at the same time at driving current according to the first view point (left eye or right eye) image data signal, and a non-light emitting period and a light emitting period of emitting light by all pixels at the same time at driving current according to the second view point (right eye or left eye) image data signal are repeated.

In detail, according to the exemplary embodiment of FIG. 10, the left eye image and the right eye image are displayed according to a driving time.

First, pixel circuits of the entire display panel are simultaneously reset for a reset period PL11 of the first frame 1Frame. Next, threshold voltages of the respective driving transistors included the pixel circuits of the entire display panel are simultaneously compensated for a threshold voltage compensating period PL12. The reset period PL11 of the first frame 1Frame and the threshold voltage compensating period PL12 correspond to a non-light emitting period PNR1.

Next, a left eye image data signal Nth_L-d to be displayed for a light emitting period PEL2 of a second frame 2 Frame which is the next frame is sequentially written for a data writing period PL13 of the first frame 1Frame. Simultaneously, the pixels of the entire display panel simultaneously display images according to a right eye image data signal N−1th_R-d of the previous frame stored in each pixel in advance, for a light emitting period PER1 of the first frame 1Frame.

Similarly, for the second frame 2 Frame subsequent to the first frame, a reset period PR21 of resetting data voltage according to the left eye image data signal Nth_L-d written in the first frame, a threshold voltage compensating period PR22 of compensating threshold voltage of the driving transistor of each pixel of the display panel, and a data writing period PR23 for which the right eye image data signal Nth_R-d corresponding to the second frame 2 Frame is sequentially written in each pixel of the display panel are subsequent to each other.

As described above, all the pixels emit the light at the driving current according to the left eye data signal stored in the data writing period PL13 of the first frame 1 for the light emitting period PEL2 simultaneously with the data writing period PR23 of the second frame 2 Frame.

The right eye image data signal Nth_R-d sequentially written for the data writing period PR23 of the second frame 2Frame emits simultaneously light according to the driving current corresponding to all the pixels in a light emitting period PER3 of a third frame 3Frame.

Accordingly, the light emitting period PEL2 of the second frame 2Frame and the light emitting period PER3 of the third frame 3Frame are subsequent to each other to display the left eye image and the right eye image, respectively, thereby implementing the 3D stereoscopic image on the screen.

According to the stereoscopic image driving method of FIG. 10, the left eye image data signals and right eye image data signals are alternately written in sequence and the inputted left eye image data and right eye image data simultaneously emit the light in sequence, thereby expressing the 3D images. In this case, the light emitting duration may be freely set regardless of scanning of each pixel of the display panel. Accordingly, a time interval between the respective view point images may be set so as to be optimized by a response speed of liquid crystal shutters of shutter glasses of a stereoscopic display device and the like.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, those skilled in the art can easily select and substitute the drawings and disclosed description. Those skilled in the art can omit some of the constituent elements described in the present specification without deterioration in performance thereof or can add constituent elements to improve performance thereof. Furthermore, those skilled in the art can modify the sequence of the steps of the method described in the present specification depending on the process environment or equipment. Therefore, the scope of the present invention must be determined by the scope of the claims and the equivalent, not by the described embodiments.

What is claimed is:

1. A display device comprising a panel including a plurality of pixels, each receiving a predetermined on-bias voltage transferred through a data line during one frame, receiving a first image data signal corresponding to the corresponding frame through the data line and storing the first image data signal to a sustain capacitor, and emitting light according to a driving current that corresponds to a second image data signal that corresponds to a previous frame of the corresponding frame, wherein a first period for storing the first image data signal to the sustain capacitor in a pixel and a second period for light emission in the pixel according to a driving current corresponding to the second image data signal overlap each other in one frame.

2. The display device of claim 1, wherein the frame comprises:

an on-bias period during which the predetermined on-bias voltage is transferred to a driving transistor of each of the plurality of pixels;

a reset period during which a predetermined reset voltage is transferred to a gate electrode of the driving transistor through the data line;

an initialization period during which a drain electrode voltage of the driving transistor of the pixel is set to first level by applying a first power source voltage with the first level from a power supply;

a compensation period during which threshold voltages of driving transistors of the respective pixels are simultaneously compensated;

a data transferring period during which a first voltage corresponding to a data voltage according to the second image data signal is transferred to a gate electrode of the driving transistor;

a data writing period during which the first image data signal is written in response to scan signals sequentially transferred to the respective pixels; and a light emitting period being overlapped with the data writing period, and during which organic light emitting diodes of the plurality of pixels simultaneously emit light according to the first voltage transferred during the data transmitting period.

3. The display device of claim 2, wherein the on-bias voltage and the first level voltage have a gate-on voltage level to turn on constituent elements of each pixel.

4. The display device of claim 2, wherein the reset voltage is set to a voltage value between the lowest value and the highest value of a data voltage according to an image data signal.

5. The display device of claim 2, wherein the first voltage is reflected with the amount of voltage changed according to a capacitance ratio of a storage element connected to a gate electrode of the driving transistor to a data voltage according to the second image data signal.

6. The display device of claim 2, wherein the plurality of pixels do not emit light during the on-bias period, the reset period, the initialization period, the compensation period, and the data transferring period.

7. The display device of claim 1, wherein the first image data signal is a first view point image data signal or a second view point image data signal corresponding to the corresponding frame, the second image data signal is a first view point image data signal or a second view point image data signal corresponding to the previous frame, and the first image data signal and the second image data signal have different view points.

8. The display device of claim 1, wherein the first image data signal is a first view point image data signal and a second view point image data signal corresponding to the corresponding frame, and light emission simultaneously occurs in the plurality of pixels according to a driving current corresponding to the first image data signal during a light emitting period of the next frame of the corresponding frame.

9. The display device of claim 1, wherein the first period is equal to or shorter than the second period.

10. The display device of claim 1, wherein each of the plurality of pixels comprises:
an organic light emitting diode;
a first transistor transferring the driving current to the organic light emitting diode;
a second transistor transferring a data voltage according to the first image data signal to a gate electrode of the first transistor according to the corresponding scan signal among a plurality of scan signals;
a third transistor provided between a gate electrode and a drain electrode of the first transistor for diode-connection of the first transistor;
a fourth transistor provided between the first transistor and the second transistor to control a potential difference of the gate electrode of the first transistor;
a fifth transistor transferring a data voltage according to a second image data signal written in the previous frame to the gate electrode of the first transistor;
a storage capacitor provided between the gate electrode and a source electrode of the first transistor to store a voltage according to a potential difference between the two electrodes; and
a compensation capacitor provided between the gate electrode of the first transistor and the storage capacitor to maintain a gate electrode voltage of the first transistor with a predetermined corresponding voltage value, the sustain capacitor storing a data voltage according to the first image data signal or the second image data signal transferred through the data line.

11. The display device of claim 10, wherein the sustain capacitor stores the data voltage stored according to the first image data signal until a data transferring period of the next frame of the corresponding frame, and stores a data voltage according to a second image data signal written in the previous frame until a data transferring period of the corresponding frame.

12. The display device of claim 10, wherein a first power source voltage applied to the source electrode of the first transistor is transferred in low level during the initialization period, a second power source voltage connected to the drain electrode of the first transistor is transferred in low level during the light emitting period, the plurality of scan signals are simultaneously transferred in a gate-on voltage level during the on-bias period, the reset period, the initialization period, and the compensation period and sequentially transferred in the gate-on voltage level to each pixel line during the data writing period, the first control signal transferred to a gate electrode of the third transistor is transferred in the gate-on voltage level during the compensation period, the second control signal transferred to a gate electrode of the fourth transistor is transferred in the gate-on voltage level during the on-bias period the reset period, the compensation period, and the data transferring period, and the third control signal transferred to a gate electrode of the fifth transistor is transferred in the gate-on voltage during the data transferring period, the data writing period, and the light emitting period.

13. The display device of claim 10, wherein a predetermined on-bias voltage is applied through a data line connected to a source electrode of the second transistor during an on-bias period while the second transistor and the fourth transistor are in the turn-on state.

14. The display device of claim 13, wherein a predetermined reset voltage is applied through the data line connected to the source electrode of the second transistor during a reset period while the second transistor and the fourth transistor are in the turn-on state, and the reset voltage is higher than the on-bias voltage.

15. The display device of claim 10, wherein the fifth transistor is provided between a node of the second transistor and the fourth transistor and the sustain capacitor, and the sustain capacitor comprises a first electrode connected to the fifth transistor and a second electrode connected to a power supply that transfers a predetermined reference voltage.

16. The display device of claim 10, wherein the sustain capacitor comprises a first electrode connected to a node of the second transistor and the fourth transistor and a second electrode connected to the fifth transistor, and the fifth transistor is provided between the sustain capacitor and a power supply transferring a predetermined reference voltage.

17. The display device of claim 1, wherein each of the plurality of pixels comprises:
an organic light emitting diode;
a first transistor transferring the driving current to the organic light emitting diode;
a second transistor transferring a voltage applied through the data line to a gate electrode of the first transistor;
a third transistor provided between the gate electrode and the drain electrode of the first transistor for diode-connection of the first transistor;
a fourth transistor provided between the first transistor and the second transistor to control a potential difference of the gate electrode of the first transistor;

a fifth transistor transferring a data voltage according to a first image data signal of the corresponding frame according to the corresponding scan signal among a plurality of scan signals, or transferring a data voltage according to a second image data signal written in the previous frame to the gate electrode of the first transistor;

a storage capacitor provided between the gate electrode and the source electrode of the first transistor to store a voltage according to a potential difference between the two electrodes;

a compensation capacitor provided between the gate electrode of the first transistor and the storage capacitor to maintain a gate electrode voltage of the first transistor with a predetermined corresponding voltage; and a sustain capacitor storing a data voltage according to the first image data signal or the second image data signal transferred through the data line.

18. The display device of claim 17, wherein the sustain capacitor stores the stored data voltage according to the first image data signal until a data transferring period of the next frame of the corresponding frame, and storing a data voltage according to a second image data signal, written in the previous frame, until a data transferring period of the corresponding frame.

19. The display device of claim 17, wherein
the first power source voltage applied to the source electrode of the first transistor is transferred in low level during the initialization period,
the second power source voltage connected to the drain electrode of the first transistor is transferred in low level during the light emitting period,
the plurality of scan signals are simultaneously transferred in a gate-on voltage level to the gate electrode of the fifth transistor during the data transferring period, and sequentially transferred in the gate-on voltage level to the gate electrode of the fifth transistor for each pixel line during the data writing period,
the first control signal transferred to the gate electrode of the third transistor is transferred in the gate-on voltage level during the compensation period,
the second control signal transferred to the gate electrode of the fourth transistor is transferred in the gate-on voltage level during the on-bias period, the reset period, the compensation period, and the data transferring period, and
the third control signal transferred to the gate electrode of the second transistor is transferred in the gate-on voltage level during the on-bias period, the reset period, the initialization period, the compensation period, the data writing period, and the light emitting period.

20. The display device of claim 17, wherein the fifth transistor is provided between a node of the second transistor and the fourth transistor and the sustain capacitor, the gate electrode of the fifth transistor is connected to a scan line transferring the corresponding scan line, and the sustain capacitor comprises a first electrode connected to the fifth transistor and a second electrode connected to a power supply transferring a predetermined reference voltage.

21. The display device of claim 17, wherein the sustain capacitor comprises a first electrode connected to a node of the second transistor and the fourth transistor and a second electrode connected to the fifth transistor, the fifth transistor is provided between the sustain capacitor and a power supply transferring a predetermined reference voltage, and the gate electrode of the fifth transistor is connected to a scan line transferring the corresponding scan signal.

22. The display device of claim 1, wherein the display device further comprises:
a scan driving generating and transferring a plurality of scan signals that activate driving of the plurality of pixels;
a data driver transferring a predetermined on-bias voltage or a data voltage according to an image data signal corresponding to the plurality of pixels through the data line;
a power controller controlling a driving power source voltage and a reference voltage supplied to the plurality of pixels;
a compensation control signal unit generating and transferring a first control signal, a second control signal, and a third control signal for controlling turning on/off of transistors included in the respective pixels according to periods included in the frame; and
a timing controller generating an image data signal corresponding to the frame by processing an external image signal and transferring the image data signal to the data driver, and controlling driving of the scan driver, the data driver, the power controller, and the compensation control signal unit.

23. A method for driving a display device including a display panel that includes a plurality of pixels, each receiving a predetermined on-bias voltage through a data line, receiving a first image data signal corresponding to the corresponding frame through a data line, storing the first image data signal to a sustain capacitor in a pixel, and emitting light according to a driving current corresponding to a second image data signal that corresponds to the previous frame of the corresponding frame, comprising:
an on-bias step for transferring the predetermined on-bias voltage to a driving transistor of each of the plurality of pixels;
a reset step for transferring a predetermined reset voltage to a gate electrode of the driving transistor through the data line;
an initialization step for setting a drain electrode voltage of the driving transistor of the pixel to a first level by applying a first power source voltage in the first level from a power supply;
a compensation step for simultaneously compensating threshold voltages of the driving transistors of the respective pixels;
a data transferring step for transferring a first voltage corresponding to a data voltage according to the second image data signal to the gate electrode of the driving transistor;
a data writing step for writing the first image data signal to the sustain capacitor in response to scan signals sequentially transferred to the respective pixels; and
a light emitting step being overlapped with the data writing step and during which organic light emitting diodes of the respective pixels simultaneously emitting light according to the first voltage transferred in the data transferring step,
wherein the light emitting step is overlapped with the data writing step for each of the plurality of pixels.

24. The method for driving the display device of claim 23, wherein a period during which the data writing step is performed is equal to or shorter than a period during which the light emitting step is performed.

25. The method for driving the display device of claim 23, wherein the on-bias voltage and a voltage of the first level has a gate-on voltage level that turns on constituent elements of each pixel.

26. The method for driving the display device of claim 23, wherein the reset voltage is set to a voltage between the lowest value and the highest value a data voltage according to an image data signal.

27. The method for driving the display device of claim 23, wherein the first voltage is reflected with the amount of voltage changed according to a capacitance ratio of a storage element connected to a gate electrode of the driving transistor to a data voltage according to the second image data signal.

28. The method for driving the display device of claim 23, wherein the plurality of pixels do not emit light during the on-bias period, the reset period, the initialization period, the compensation period, and the data transferring period.

29. The method for driving the display device of claim 23, wherein the first image data signal is a first view point image data signal or a second view point image data signal corresponding to the corresponding frame, the second image data signal is a first view point image data signal or a second view point image data signal corresponding to the previous frame, and the first image data signal and the second image data signal have different view points.

30. The method for driving the display device of claim 23, wherein the first image data signal is a first view point image data signal and a second view point image data signal corresponding to the corresponding frame, and light emission simultaneously occurs in the plurality of pixels according to a driving current corresponding to the first image data signal during a light emitting period of the next frame of the corresponding frame.

* * * * *